(12) United States Patent
So

(10) Patent No.: US 7,995,914 B2
(45) Date of Patent: Aug. 9, 2011

(54) METHOD AND SYSTEM FOR PROVIDING FAULT RECOVERY USING COMPOSITE TRANSPORT GROUPS

(75) Inventor: Ning So, Plano, TX (US)

(73) Assignee: MCI Communications Services, Inc., Basking Ridge, NJ (US)

( * ) Notice: Subject to any disclaimer, the term of this patent is extended or adjusted under 35 U.S.C. 154(b) by 702 days.

(21) Appl. No.: 12/057,947

(22) Filed: Mar. 28, 2008

(65) Prior Publication Data
US 2009/0245783 A1   Oct. 1, 2009

(51) Int. Cl.
*H04B 10/00* (2006.01)
(52) U.S. Cl. .................................. 398/5; 398/2; 398/72
(58) Field of Classification Search ................. 398/1–8, 398/72
See application file for complete search history.

(56) References Cited

U.S. PATENT DOCUMENTS

| | | | | |
|---|---|---|---|---|
| 5,093,824 | A * | 3/1992 | Coan et al. ..................... | 370/228 |
| 6,111,673 | A * | 8/2000 | Chang et al. .................... | 398/79 |
| 7,155,120 | B1 * | 12/2006 | Ofek et al. ....................... | 398/7 |
| 7,167,443 | B1 * | 1/2007 | Dantu et al. ................... | 370/218 |
| 7,426,179 | B1 * | 9/2008 | Harshavardhana et al. .. | 370/219 |
| 7,508,846 | B2 * | 3/2009 | Peng ............................. | 370/536 |
| 7,574,133 | B2 * | 8/2009 | Fang ............................... | 398/4 |
| 7,738,359 | B1 * | 6/2010 | Suryaputra et al. ........... | 370/216 |
| 7,764,596 | B2 * | 7/2010 | Saleh et al. .................... | 370/216 |
| 2005/0036442 | A1 * | 2/2005 | Saleh et al. ................... | 370/216 |
| 2007/0280682 | A1 * | 12/2007 | Sichani et al. ................... | 398/5 |
| 2008/0207251 | A1 * | 8/2008 | Anderson ...................... | 455/522 |
| 2008/0279103 | A1 * | 11/2008 | Yong et al. ................... | 370/235 |
| 2008/0298799 | A1 * | 12/2008 | Takihiro et al. .................. | 398/2 |
| 2009/0185569 | A1 * | 7/2009 | Yong et al. ............... | 370/395.31 |
| 2009/0245783 | A1 * | 10/2009 | So ................................... | 398/5 |
| 2009/0324232 | A1 * | 12/2009 | So .................................. | 398/83 |
| 2010/0027415 | A1 * | 2/2010 | So et al. ........................ | 370/225 |

* cited by examiner

*Primary Examiner* — Agustin Bello

(57) ABSTRACT

An approach is provided for performing fault recovery using composite transport groups (CTGs). A first logical channel is established within a composite transport group, wherein the first logical channel is established over a first link associated with a first service provider to a customer premise equipment (CPE) node configured to transport packets. A second logical channel is established within the composite transport group, wherein the second logical channel is established over a second link associated with a second service provider to an optical node. Packets are received over the first logical channel. Packets are received over the second logical channel if the first logical channel experiences a fault condition, wherein switching to the second logical channel is transparent to the CPE node.

22 Claims, 9 Drawing Sheets

FIG. 5A

| CLIENT NODE | ALLOTTED CAPACITY (MBPS) | ASSIGNED COMPOSITE LINK | ASSIGNED COMPONENT CONNECTION | UTILIZED BANDWIDTH (MBPS) |
|---|---|---|---|---|
| NODE "1" | 1000 | 1 | 2 | 738 |
| NODE "2" | 500 | 1 | 1 | 29 |
| NODE "3" | 700 | 2 | 1 | 174 |
| . . . | . . . | . . . | . . . | . . . |
| NODE "N" | 200 | N | M | 180 |

| CTG | LOAD (GBPS) | COMPONENT CONNECTION | LOAD (GBPS) | MAXIMUM BANDWIDTH (GBPS) | STATUS |
|---|---|---|---|---|---|
| 1 | 4.3 | 1 | 0 | 6 | OUT OF SERVICE |
|  |  | 2 | 1.9 | 40 | IN SERVICE |
|  |  | 3 | 2.4 | 10 | IN SERVICE |
| 2 | 3.6 | 1 | 1.8 | 100 | IN SERVICE |
|  |  | 2 | 1.8 | 100 | IN SERVICE |
| . . . | . . . | . . . | . . . | . . . | . . . |
| N | 10.4 | 1 | 2.1 | 40 | IN SERVICE |
|  |  | . . . | . . . | . . . | . . . |
|  |  | M | 2.3 | 40 | OUT OF SERVICE |

551  553  555  557  559  561

METHOD AND SYSTEM FOR PROVIDING FAULT RECOVERY USING COMPOSITE TRANSPORT GROUPS

BACKGROUND INFORMATION

Telecommunications networks have developed from connection-oriented, circuit-switched (CO-CS) systems, e.g., such as the public switched telephone network (PSTN), utilizing constant bit-rate, predefined point-to-point connections to connectionless, packet-switched (CNLS) systems, such as the Internet, utilizing dynamically configured routes characterized by one or more communication channels divided into arbitrary numbers of variable bit-rate channels. With the increase in demand for broadband communications and services, telecommunications service providers are beginning to integrate long-distance, large-capacity optical communication networks with these traditional CO-CS and CNLS systems. Typically, these optical communication networks utilize multiplexing transport techniques, such as time-division multiplexing (TDM), wavelength-division multiplexing (WDM), and the like, for transmitting information over optical fibers. However, an increase in demand for more flexible, resilient transport is driving optical communication networks toward high-speed, large-capacity packet-switching transmission techniques, wherein switching and transport functions occur in completely optical states via one or more packets. Accordingly, as these optical communication networks continue to grow, there is an increasing need for telecommunication service providers to develop fast failure recovery techniques to protect working optical communication paths from experiencing downtime as a result of link and/or equipment failure.

Therefore, there is a need for an approach that provides packet-switched optical networks with efficient fault recovery techniques.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 5A and 5B are, respectively, diagrams of a network traffic profile and a composite transport group status table, according to various exemplary embodiments;

DESCRIPTION OF THE PREFERRED EMBODIMENT

A preferred apparatus, method, and software for providing fault recovery using composite transport groups are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although the various exemplary embodiments are described with respect to fault recovery on packet-switched optical transport networks, it is contemplated that the various exemplary embodiments are also applicable to other equivalent transport networks, such as circuit-switched, burst-switched, label-switched, packet-switched, wavelength-switched, etc., networks.

Figure 1:
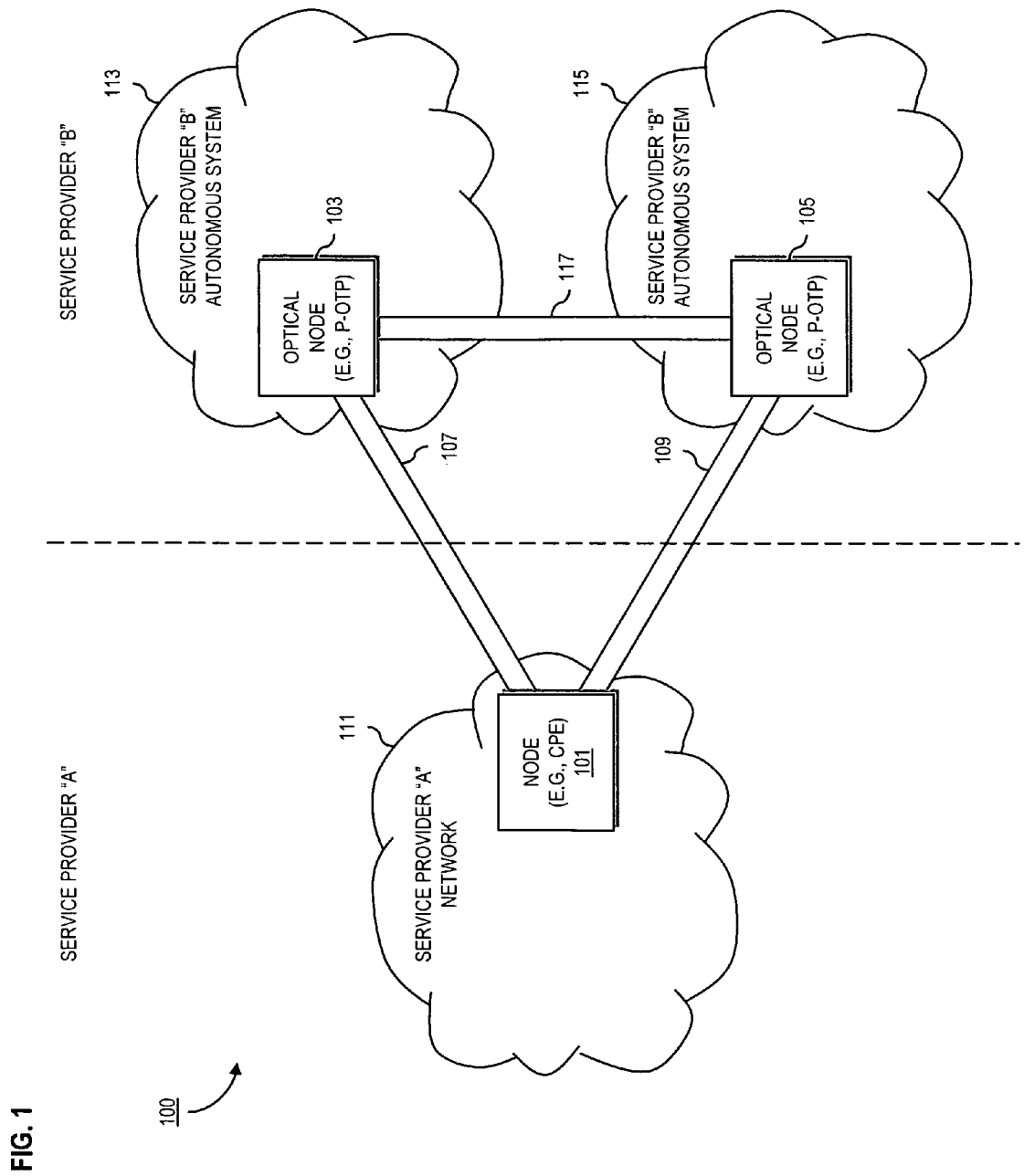
FIG. 1 is a diagram of a system for providing fault recovery using composite transport groups, according to an exemplary embodiment.

FIG. 1 is a diagram of a system for providing fault recovery using composite transport groups, according to an exemplary embodiment. For the purposes of illustration, a system 100 for providing fault recovery among client nodes (e.g., node 101) and one or more optical nodes (e.g., optical nodes 103 and 105) using composite transport groups (CTGs) is described with respect to packet-switched optical infrastructures provisioned by disparate service providers, e.g., service provider "A" and service provider "B." In this manner, optical links 107 and 109 may be considered "off-network" links (i.e., transport channels extending between network 111 of service provider "A" and autonomous systems (AS) 113 and 115 of service provider "B"), while optical link 117 may be considered an "on-network" link (i.e., a transport channel extending between autonomous systems 113 and 115 of service provider "B"). It is noted that the systems 113 and 115 can be sub-networks of a single autonomous system, in an alternative embodiment. The client (subscriber or customer) nodes 101 are customer premise equipment (CPE), according to one embodiment, with the optical nodes 103 and 105 are under control of the service provider, which in this instance is service provider "B." Additionally, it is contemplated that the CPE node 101 can be owned by the service provider. While specific reference will be made thereto, it is contemplated that system 100 may embody many forms and include multiple and/or alternative components and facilities.

Traditionally, telecommunications service providers have implemented fault recovery techniques in optical communication networks via "1+1," "1:1," and "1:N" pathway protection schemes. Briefly, in "1+1" pathway protection, a transmitting node splits an optical signal (i.e., network traffic) into two identical copies, such that each copy is simultaneously transmitted over two separate physical pathways established between transmitting and receiving nodes. Upon reception, receiving nodes monitor the quality of the two optical signals, and utilize the "better" of the two signals. If one pathway fails, then receiving nodes may receive data on the "other" pathway. In "1:1" pathway protection, optical signals are carried over a "working" pathway only, and in the event of working pathway failure, the optical signals are switched over to a "backup" pathway by the transmitting and receiving nodes. Since the backup pathway is only utilized during working pathway failure, then it is also possible to share the backup pathway between multiple working pathways, i.e., in "1:N" pathway protection. In any instance, however, multiple physical pathways must be established between transmitting and receiving nodes, whether or not the pathways are geographically dispersed. Nevertheless, given the fact that multiple physical pathways are required, "1+1," "1:1," and "1:N" pathway protection schemes represent expensive, bandwidth-inefficient techniques for fault recovery. It is apparent that improvements are needed.

Therefore, the approach according to certain embodiments stem from the recognition that by providing fault recovery through CTGs, telecommunications service providers can implement cost-effective, bandwidth efficient pathway protection. This is because CTGs manage sets of logical channels as "composite connections," as well as associations between client node instances and composite connections, which enable CTGs to dynamically distribute network traffic over the composite connections based on this information, as well as based on logical channel fault notification and composite connection status. In other words, CTGs, among other features, enable individual pathways to carry network traffic from multiple client nodes, maintain independent pathway transport availabilities and capacities, and provide for disparate transport rates, all the while enabling individual pathways to provide pathway protection for one another.

According to one embodiment, system 100 provides fault recovery based on the configuration of composite transport groups (CTGs) established between a client node 101, such as a client device, router, switch, or any other suitable customer premise equipment (CPE) (or Provider Edge (PE)), and two or more optical nodes, (e.g., optical nodes 103 and 105), such as a reconfigurable optical add/drop multiplexer (ROADM), or other suitable optical transport platform (e.g., P-OTP (packet optical transport platform)). It is noted that the CTGs are configured to provide connection-oriented, e.g., network traffic embodying, for example, information packetized into one or more packets; furthermore, connectionless communications can be encapsulated within a connection-oriented connection. In exemplary embodiments, one CTG (or composite connection) may be established for transport of network traffic from client node 101 to optical node 103, and may include a first set (or bundle) of logical channels (or component connections), while another CTG may be established for transport of network traffic from client node 101 to optical node 105, and may include a second set of logical channels. The first set of logical channels may include a logical channel defined by optical link 107 (e.g., a primary channel) and a logical channel defined by the conjunction of optical links 109 and 117 (e.g., a secondary (or protection) channel). The second set of logical channels may include a logical channel defined by optical link 109 (e.g., a primary channel) and a logical channel defined by the conjunction of optical links 107 and 117 (e.g., a secondary channel). It is contemplated; however, that logical channels may also be grouped in multiple CTGs.

According to other embodiments, fault recovery may be implemented via optical nodes 103 and 105 based on the detection of a failure condition relating to one of the logical channels extending between client node 101 and optical nodes 103 or 105, i.e., optical links 107 and 109. Failure conditions may stem from optical link failure and/or equipment failure. Moreover, the failure conditions may relate to either soft failures (i.e., performance degradation) or hard failures (i.e., total, or catastrophic failure). If a failure condition is detected, fault recovery may be implemented transparently with respect to the client nodes, e.g., client node 101, and can be performed based on the availability of remaining logical channels associated with an affected CTG. Namely, packets may be partially or wholly diverted from logical channels associated with the failure condition to logical channels that are not associated with the failure condition. It is contemplated; however, that in those instances where affected logical channels are associated with multiple CTGs, fault recovery measures can be performed among the multiple CTGs.

Under the above arrangement, use of CTGs can save, for instance, up to 50% access cost compared with traditional systems. This approach can protect access service against any single link and card failure between site 111 and sites 113, 115. In addition, the service provider can save carrier up to 50% on port costs. Further, customer provisioning can be simplified for the CPE node 101, ensuring link/card failure does not cause dramatic traffic pattern change.

The system 100 permits the CPE router/switch 101 to treat CTGs as physical trunks. Instead of the CPE 101 re-routing traffic during failure conditions, the CTG handles the failure and re-routes the traffic on its own. This preserves the configurations at the CPE 101; and the optical nodes 103, 105 (e.g., PE/P-OTP).

As seen in FIG. 1, system 100 includes networks 111, 113, and 115 that, in turn, include nodes 101, 103, and 105, respectively. In exemplary embodiments, system 100 is a connection-oriented transport environment having one or more optical links (e.g., optical links 107-109) established therein, wherein individual optical links embody optical fibers configured to carry data between two nodes, e.g., between nodes 101 and 103. It is noted that optical links 107, 109, and 117 may be automatically setup and torn down by means of any suitable signaling protocol. Accordingly, optical links 107, 109, and 117 may carry information over various wavelengths or "channels."

Networks 113-115 may be any type of wired and/or wireless transport network, such as a local area network (LAN), metropolitan area network (MAN), wide area network (WAN), etc. At least a portion of networks 113-115 comply with the International Telecommunications Union-Telecommunication (ITU-T) standards recommendation working draft G.800 titled, "Unified Functional Architecture of Transport Networks," which is incorporated herein, by reference, in its entirety. Client node 101 may be any suitable customer premise equipment, such as a computing device, router, switch, etc., while optical nodes 103 and 105 may be any suitable optical transport platform, such as a terminal multiplexor, a reconfigurable add/drop multiplexer, photonic switch, optical cross-connect with optical-electrical-optical conversion, synchronous optical networking cross-connect, signal regenerator, router, switch, or any other suitable optical networking interface, such as a packet optical transport platform. In this manner, information transport can occur between nodes 101-105 of networks 111-115 via optical links 107, 109, and 117, which represent channels (or paths) along which packets may be transported. As such, a topology of system 100 can be characterized via optical links 107, 109, and 117, which further characterize the available transport capacity (e.g., bandwidth capacity) between nodes 101-105 of networks 113-115. Thus, during optical link configuration, optical links 107, 109, and 117 may be established and grouped into one or more CTGs for enabling fault recovery.

Figure 2:
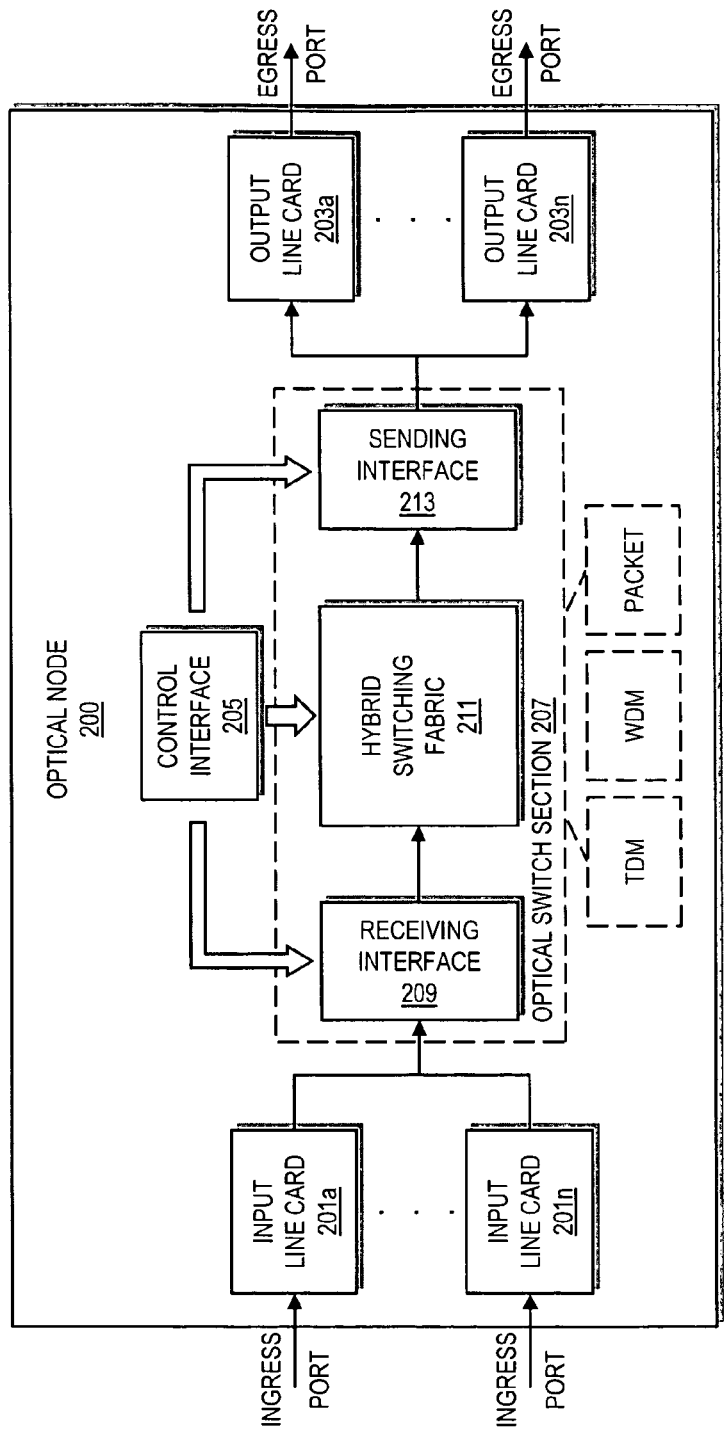
FIG. 2 is a diagram of an optical node configured to provide composite transport groups, according to an exemplary embodiment.

FIG. 2 is a diagram of an optical node configured to provide composite transport groups, according to an exemplary embodiment. For descriptive purposes, optical node 200 is described with respect to packet switching; however, may include functionality for optical burst switching, time division multiplexing (TDM), wavelength-division multiplexing (WDM), etc. As shown, optical node 200 includes input line cards 201a-201n, output line cards 203a-203n, control interface 205, and optical switch section 207; however, it is contemplated that optical node 200 may embody many forms. For example, optical node 200 may comprise computing hardware (such as described with respect to FIG. 8), as well as include one or more components configured to execute the processes described herein for providing fault recovery using composite transport groups. Furthermore, it is contemplated that the components of optical node 200 may be combined, located in separate structures, or separate physical locations. In other words, a specific topology is not critical to embodiments of optical node 200 or system 100 for that matter.

According to one embodiment, input line cards 201a-201n act as "n" input interfaces to optical node 200 from "n" transmitting nodes (e.g., client node 101), while output line cards 203a-203n act as "n" output interfaces from optical node 200 to "n" destination nodes (e.g., optical nodes 103 and 107). When packets arrive at optical node 200, input line cards 201a-201n port packets to receiving interface 209 of optical switch section 207. Receiving interface 209 separates headers and payloads from individual packets. Header information is provided to control interface 205 for routing purposes, while payloads are switched to destination output line cards 203a-203b via hybrid switching fabric 211 and sending interface 213. That is, hybrid switching fabric 211 routes payloads to appropriate pathways on sending interface 213, whereby updated headers are combined with switched payloads. The combination is output to destination nodes via output line cards 203a-203n.

In particular implementations, control interface 205 is configured to provision one or more logical channels through hybrid switching fabric 211 based on system 100 topological information provided to control interface 205. These logical channels can be grouped into one or more CTGs. According to one embodiment, control interface 205 establishes the aforementioned CTGs for transport of network traffic from client node 101 to optical node 103, and from client node 101 to optical node 105.

Figure 3:
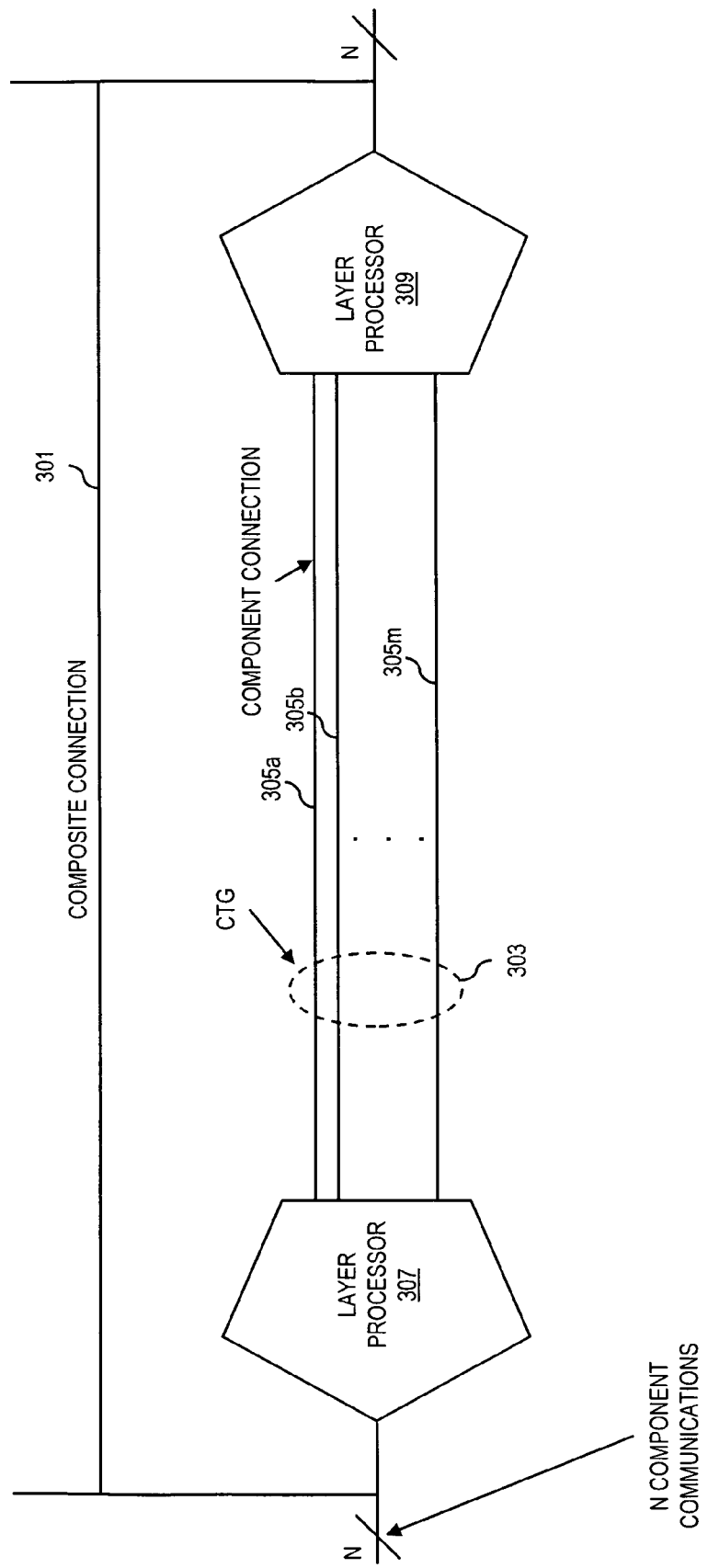
FIG. 3 is a diagram of a composite transport group, according to an exemplary embodiment.

Thus, by grouping one or more logical channels (or component connections) into a CTG, networks can achieve transportation resilience over composite connections, which route network traffic transparently from transmitting and receiving nodes. FIG. 3 is a diagram of a composite transport group, according to an exemplary embodiment. As shown, composite connection 301 is made available via CTG 303, which includes one or more parallel component connections (e.g., physical and/or logical links), e.g., component connections 305a-305m, sharing similar ingress and egress points.

Accordingly, and from the perspective of CTG 303, each component connection 305a-305m acts as an independent transportation entity, and therefore, enables independent transportation path availabilities for composite connection 301, i.e., for network traffic. That is, if network traffic (e.g., a number of packetized messages) is sequenced at ingress and transported over one or more component connections (e.g., component connection 305a-305m), then the network traffic may or may not arrive at egress in the same sequential order. Thus, when information is transported via composite connection 301 utilizing CTG 303, a layer processor (LP) at ingress (e.g., LP 307) distinguishes component connections 305a-305m by processing each packet and distributing the packets over composite connection 301 via one or more of component connections 305a-305m. The ability of LP 307 to distinguish between component connections 305a-305m is dependent upon packet header format and information encoded therein. Thus, if a particular component connection (e.g., component connection 305a) fails, LP 307 is configured to utilize reserved bandwidth capacity in the "other" component connections (e.g., component connections 305b-305m) to transport network traffic, i.e., LP 307 reroutes network traffic transparently from the entity attempting to transport the traffic. In this manner, a network gains transport resilience via composite connections 301 because individual component connection failures are automatically resolved via the remaining operational component connections, and the transportation entities are only privy to the fact that composite connection 301, as a whole, is operational.

Thus, composite connection 301 made available via CTG 403 can be applied in both connection-less packet-switched (CL-PS) optical networks, as well as in connection-oriented packet-switched (CO-PS) optical networks. In CL-PS environments, component connections 305a-305m can exist as point-to-point links between autonomous systems (e.g., autonomous systems 113 and 115). Optical nodes 103 and 105 utilize information encoded in packet headers provided by, for example, client nodes (e.g., node 101) to distinguish between client communications. That is, the processing entity (e.g., control interface 205) of optical nodes 103 and 105 utilizes this information to differentiate between component connections (e.g., component connections 305a-305m) and distribute network traffic over one or more CTGs (e.g., CTG 303). Thus, network traffic transported via CTG 303 is "seen" by client nodes (e.g., node 101) as "belonging" to composite connection 301, as opposed to the particular component connection 305a-305m "actually" supporting the transport of network traffic.

In CO-PS environments, component connections 305a-305m of CTG 303 can be configured as point-to-point links, as above, or as point-to-point paths. Paths may be established over one or more optical links (e.g., optical links 107, 109, and/or 117) and, thereby, traverse one or more nodes (e.g., nodes 101-105). For composite connection 301 to support multiple communications from client nodes (e.g., node 101) information may be encoded within individual packet headers to differentiate between communications. Accordingly, at composite connection 301 ingress, LP 307 can use this information to distribute packets over component connections 305a-305m, which enables multiple composite connections 301 to be configured over a CTG, such as CTG 303. Further, LP 307 may, when determining which component connection to utilize to support transport, use this information to perform traffic engineering and routing processes, e.g., to assign resource capacity or priority for individual communications, etc. In particular embodiments, this information may be acquired from a network management system (not shown), as opposed to the packet headers. Thus, a composite connection 301 may be traffic engineered per component connections 305a-305m, as well as traffic engineered based on component connection attributes, e.g., bandwidth capability, operational status, and the like, or node 101 attributes, e.g., allocated capacity, origination address, destination address, etc. Particular client node attributes and component connection attributes are described with respect to FIGS. 5A and 5B.

As previously mentioned, system 100 utilizes logical channels (or component connections) over one or more CTGs for information transport, which allows for transport resilience given the independent transport availability of several component connections being grouped as a CTG and, thereby, forming a composite connection.

Figure 4:
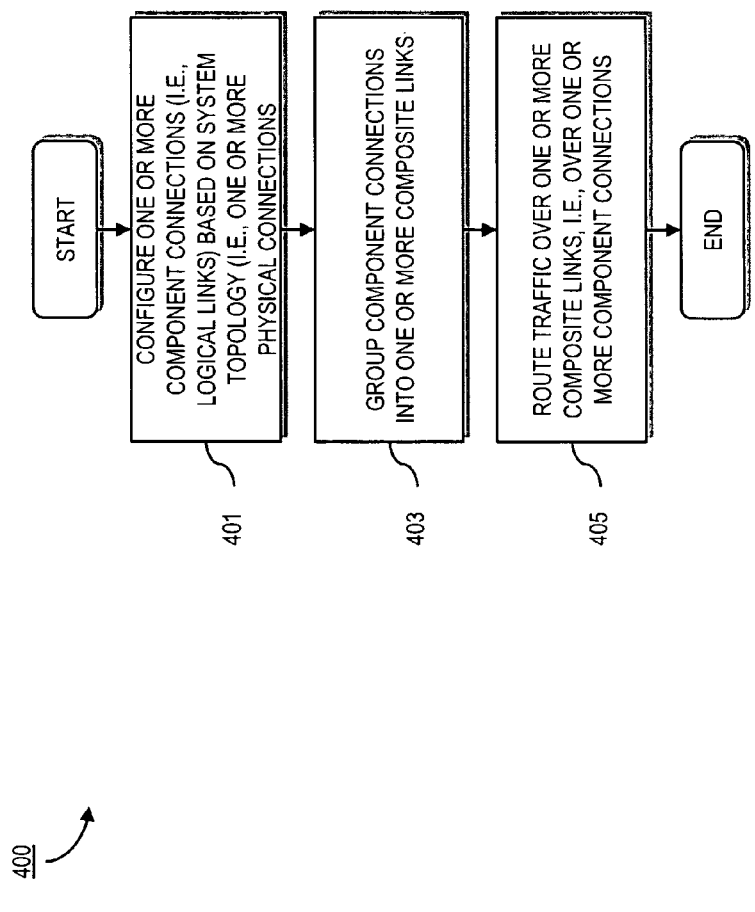
FIG. 4 is a flowchart of a process for routing network traffic via composite transport groups, according to an exemplary embodiment.

FIG. 4 is a flowchart of a process for routing network traffic via composite transport groups, according to an exemplary embodiment. For illustrative purposes, process 400 is described with reference to FIGS. 1 and 3. It is noted that process 400 assumes the existence of one or more previously established (or constructed) physical connections (e.g., optical links 107, 109, and 117) configured to transport network traffic, such as user information or network control information. The steps of process 400 may be performed in any suitable order or combined in any suitable manner.

At step 401, one or more optical nodes (e.g., optical nodes 103 and 105) configure one or more component connections (i.e., logical channels) based on a topology of system 100, i.e., based on the establishment of one or more physical connections (e.g., optical links 107, 109, and 117). Individual component connections may be configured over an optical link (e.g., optical link 107) or over a group of optical links (i.e., a path), such as a path defined by optical links 109 and 117. In this manner, component connections are independent channels configured for transporting information, wherein each component connection is individually characterized by its own transport availability, i.e., existence, maximum bandwidth, and operational status. Thus, in step 403, various component connections may be grouped into one or more CTGs, such that any given CTG (e.g., CTG 303) includes several parallel component connections (e.g., component connections 305a-305m) establishing a transport route from a desired point "A," e.g., node 101, to a desired point "B," e.g., optical node 103. For example, system 100 may be characterized by two CTGs, e.g., one CTG may embody optical link 107 (i.e., a physical component connection) and the conjunction of optical links 109 and 117 (i.e., a logical component connection or a path), and the second CTG may embody optical link 109 and the conjunction of optical links 107 and 117. The characteristics of a composite connection (or CTG) may be stored to a memory (not shown) of, for example, optical nodes 103 and 105 and/or any other suitably accessible repository (not shown) of system 100. According to one embodiment, the CTG characteristics may be stored to one or more profiles (or tables) of information, such as network traffic profile and/or CTG status table 550 optical nodes 103 and 105 may route network traffic over one or more CTGs (e.g., CTG 303), per step 405. That is, network traffic, such as packetized optical signals, can be transported over one or more component connections (e.g., component connection 305a-305m), which are defined by one or more optical links (e.g., optical links 107, 109, and 117).

FIGS. 5A and 5B are, respectively, diagrams of a network traffic profile and a CTG status table, according to various exemplary embodiments. Network traffic profile 500 provides network traffic visibility so as to enable optical nodes 103 and 105 the ability to maximize and efficiently allocate available bandwidth among various information transporting nodes, e.g., node 101, based on, for instance, component connection availabilities. In essence, profile 500 aids in the design, implementation, and maintenance of quality of service (QoS) by providing knowledge of one or more traffic instances. As shown, profile 500 provides categories for client node 501 (i.e., devices transporting information over, for example, system 100), allocated capacity 503 (i.e., amount of bandwidth provisioned to corresponding client nodes), assigned CTG 505 (i.e., CTG "currently" supporting corresponding client node traffic), assigned component link 507 (i.e., corresponding component connection of the CTG supporting corresponding client node traffic), and utilized bandwidth 509 (i.e., a "current" consumption of allotted bandwidth by client nodes). It is noted, however, that network traffic profile 500 may include any other suitable network traffic parameter, such as administrative cost, capacity reduction factor, holding priority, over-subscription factor, path bandwidth requirement, placement priority, etc.

Moreover, CTG status table 550 can provide system overview information, i.e., an accounting of the transport availabilities of one or more CTGs, as well as the component connections associated therewith. As such, table 550 also enables optical nodes 103 and 105 to maximize and efficiently allocate bandwidth, as well as dynamically distribute network traffic upon network failure notification, such as a component connection going "out-of-service." In essence, table 550 aids in fault management and recovery by providing knowledge of the status of the component connections. According to one embodiment, table 550 includes categories for CTGs 551 (i.e., macro accounting of available transport links), load 553 (i.e., macro accounting of the "current" amount of bandwidth transported via corresponding CTGs), component connection 555 (i.e., micro accounting of available transport links associated with corresponding CTGs), load 557 (i.e., micro accounting of the "current" amount of bandwidth being transported via corresponding component connections), maximum bandwidth 559 (i.e., total bandwidth capability of corresponding component connections), and status (i.e., "current" operational state of component connections). It is noted, however, that CTG status table 550 may include other suitable parameters. Further, profile 500 and table 550 may be grouped or otherwise divided.

Accordingly, system 100 can provide for transport resilience upon failure conditions, such as link failure or equipment failure. That is, CTGs enable system 100 to dynamically distribute network traffic based on component connection fault notification, component connection status, and/or client node bandwidth allowances and demands. It is noted that these failure conditions may be soft (i.e., performance degradation) or hard (i.e., total, or catastrophic failure).

Figure 6:
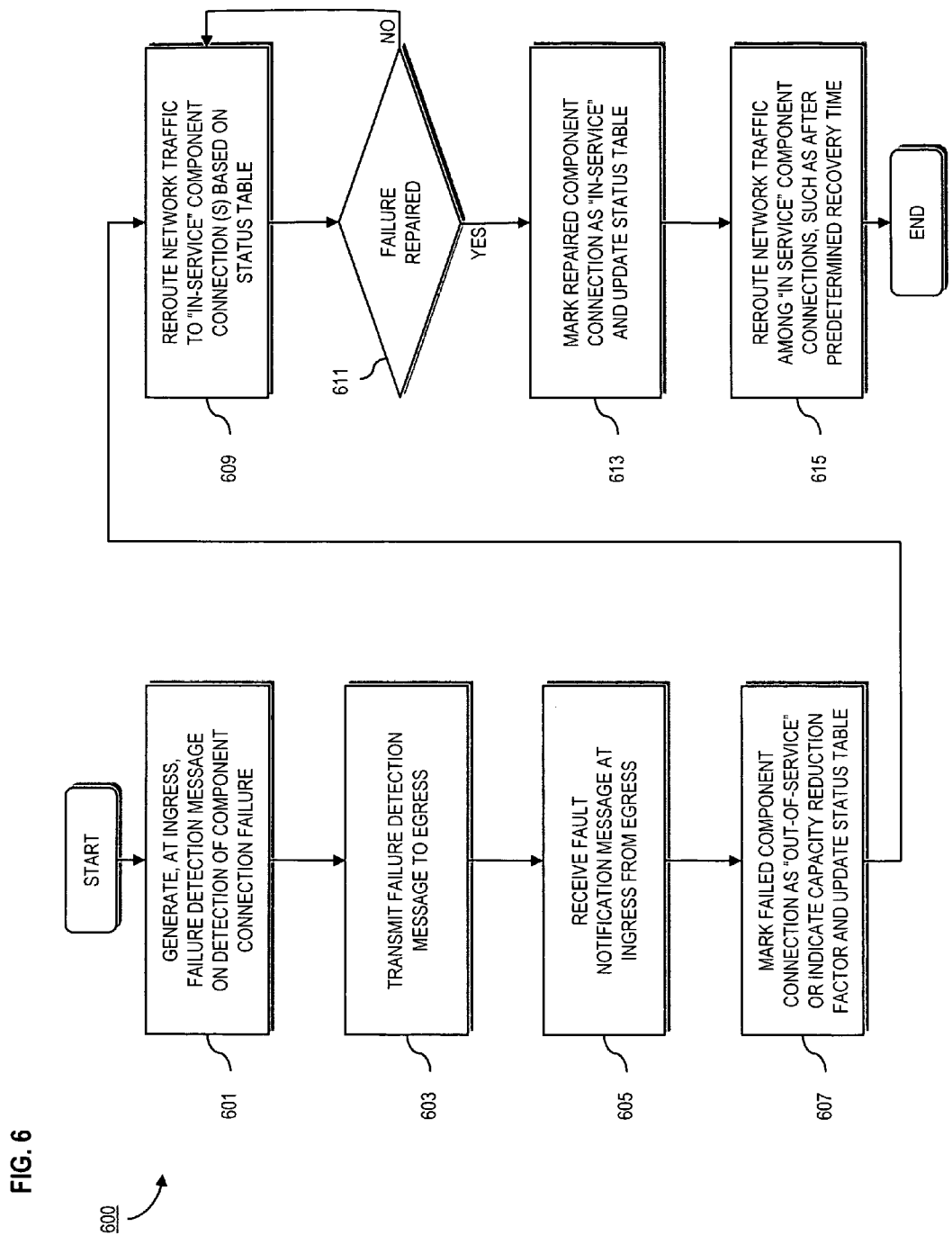
FIG. 6 is a flowchart of a process for fault recovery via composite transport groups, according to an exemplary embodiment.

FIG. 6 is a flowchart of a process for fault recovery via composite links, according to an exemplary embodiment. For illustrative purposes, process 600 is described with reference to FIG. 3. It is noted that the steps of process 600 may be performed in any suitable order or combined in any suitable manner. At step 601, LP 307 detects component connection failure on, for example, component connection 305a ingress, and generates failure detection message for transmission over an adjacent component connection, e.g., component connection 305b, i.e., on a forward path. Accordingly, LP 307 transmits failure detection message towards component connection 305a egress via component connection 305b, in step 603. Once component connection 305a egress receives failure detection message, LP 309 generates fault notification message and transmits fault notification message towards component connection 305a ingress via component connection 305b, i.e., on a reverse path. In this manner, LP 307 receives fault notification message from LP 309 and transfers it to component connection 305a ingress, per step 605. According to certain embodiments, fault notification messages are continually or periodically provided until component connection 305a is repaired. As such, component connection 305a ingress marks, per step 607, component connection 305a as "out-of-service" via LP 307, upon a hard failure. When the failure is soft, component connection 305a ingress maintains component connection 305a as "in-service," but provides a capacity reduction factor for limiting the amount of network traffic supported by the degraded connection. The capacity reduction factor may be utilized to reduce, for example, the maximum bandwidth 559 of affected component connections. In either instance, this information is recorded in, for example, CTG status table 550 maintained in, for instance, a memory (not shown) of LP 307 or another suitably accessible memory or repository (not shown) of system 100. Thus, at step 609, LP 307 routes all network traffic among "in-service" component connection(s), e.g., component connections 305b-305m, based on one or more parameters of the CTG status table 550. Hence, composite connections 301 enable network traffic to be restored quickly and efficiently, without requiring client nodes (e.g., client node 101) to be reconfigured for rerouting transmissions, which can be a time consuming and costly.

During step 611, LP 307 continues to monitor the state (e.g., fault status) of component connection 305a ingress, such as in a continuous, periodic, or "on-demand" fashion. If the failure is not recovered, LP 307 continues to route network traffic over "in-service" component connections, i.e., component connections 305b-305m, based on availability and capacity to support network traffic. Once the failure is recovered, component connection 305a ingress stops receiving fault notification messages, and marks, via LP 307, component connection 305a as "in-service" or updates maximum bandwidth 559, either of which is recorded in component connection status table 550, per step 613. After, for instance, the duration of a predetermined recovery time, LP 307 may then reroute network traffic among the various "in-service" component connections, i.e., component connections 305a-305m.

Accordingly, because LP 307 is privy to information concerning network traffic instances and CTG statuses, composite connections 301 enable LPs (e.g., LP 307) to perform dynamic network traffic distributions based on the status and capacity of the various component connections. Further, CTGs allow grouped component connections (e.g., component connections 305a-305m) to protect one another, instead of requiring additional physical connections, i.e., additional optical links, to be constructed. Thus, if one component connection fails (whether soft or hard), affected network traffic may be redistributed to one or more of the unaffected component connections within a composite link, whereas in a conventional system network traffic would be required to be provisioned on a separate "protection" path, i.e., an optical link provided in the case of primary optical link failure, which inefficiently expends resources. If component connections are grouped to more than one CTG, then multiple CTGs can take action to recover and redistribute network traffic, whereas in conventional systems, only the "protection" paths may be utilized. Furthermore, if multiple component connections fail (whether soft or hard), network traffic may still be redistributed based on the status and capacity reduction factor of the component connections; however, if both the primary and protection paths of a conventional system fail (whether soft or hard), then network traffic cannot resume until one of the paths is repaired.

Figure 7:
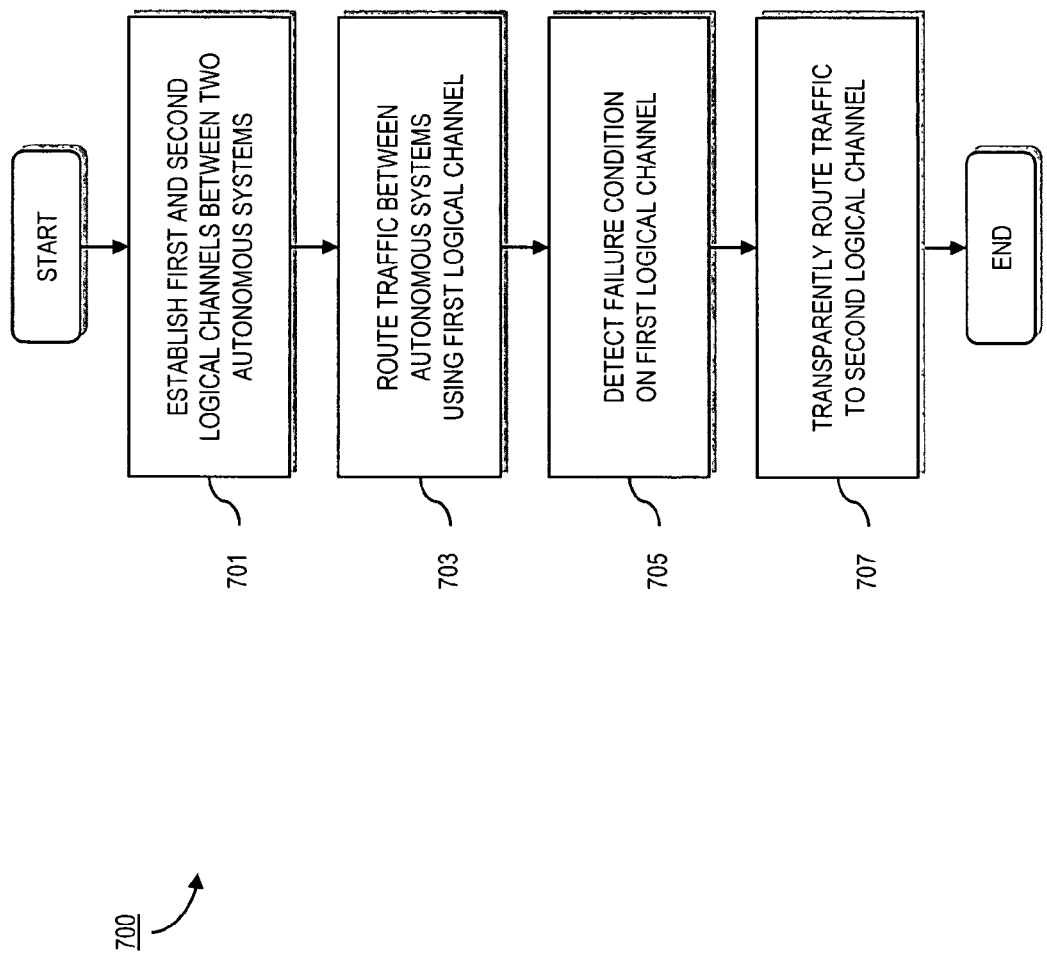
FIG. 7 is a flowchart of a process for fault recovery between autonomous systems using composite transport groups, according to an exemplary embodiment.

FIG. 7 is a flowchart of a process for fault recovery between autonomous systems using composite transport groups, according to an exemplary embodiment. For illustrative purposes, process 700 is described with reference to FIG. 1. In step 701, optical nodes 103 and/or 105 establish first and second logical channels between two autonomous systems, e.g., network 111 and the conjunction of autonomous systems 113 and 115, as part of a CTG. For example, optical node 103 may provision, via any suitable signaling protocol, a first logical channel over optical link 107, and a second logical channel over the conjunction of the optical links 109 and 117. In this manner, optical node 103 and 105 may utilize the first logical channel as a primary logical channel (e.g., a working channel) and the second logical channel as a secondary logical channel (e.g., a protection channel). Thus, during step 703, network traffic (e.g., packets) originating at client node 101 for optical node 103 will be routed between the autonomous systems via the first logical channel. At step 705, however, optical node 103 detects a failure condition affecting the first logical channel, such as a hard optical link failure to optical link 107. Based on the failure detection, optical node 103 updates network traffic profile 500 and/or CTG status table 550, such that the network traffic can be routed to the second logical channel transparently from client node 101, per step 707. Namely, client node 101 still "thinks" network traffic is routed via the macro CTG; however, a disparate logical channel (i.e., the second logical channel) is transporting the network traffic between the autonomous systems, instead of the first logical channel. Accordingly, the CTG saves service provider "B" substantial resources, as only one primary off-network optical link must be provisioned between network 111 and autonomous systems 113 and 115 (i.e., optical links 107 and 109), wherein path protection is achieved for these off-network optical links via an on-network optical link (e.g., optical link 117) extending between autonomous systems 113 and 115. Further, bandwidth is not unnecessarily wasted via a separate projection path because the protection path described herein is also provisioned as a primary path within another CTG for the transport of network traffic between client node 101 and optical node 105. It is noted that the steps of process 700 may be performed in any suitable order or combined in any suitable manner.

The processes described herein for providing fault recovery using composite transport groups may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
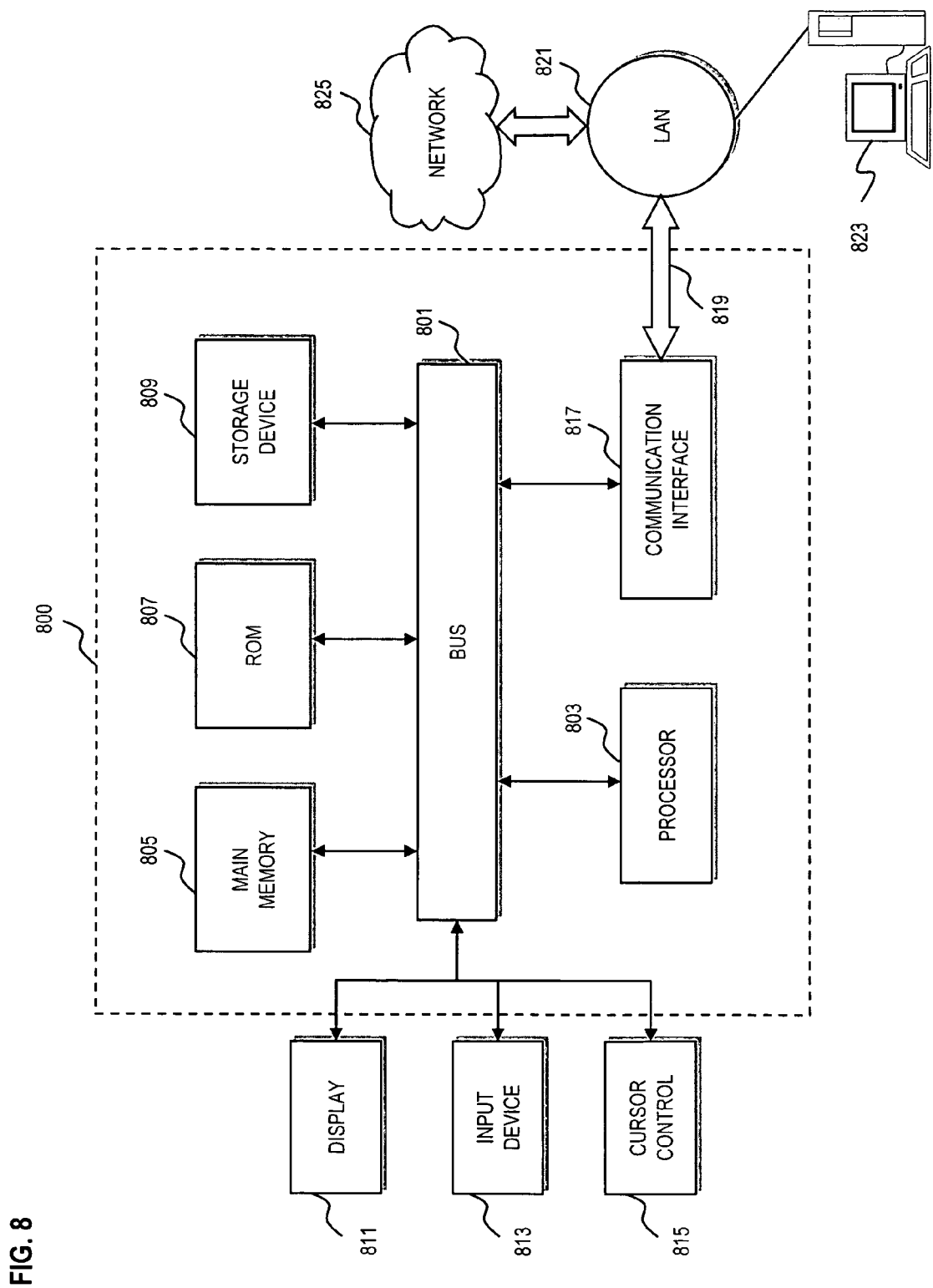
FIG. 8 is a diagram of a computer system that can be used to implement various exemplary embodiments.

FIG. 8 illustrates computing hardware (e.g., computer system) 800 upon which an embodiment according to the invention can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
 establishing a plurality of composite transport groups among a customer premise equipment (CPE) node, a first optical node, and a second optical node,
 wherein the composite transport groups provide transport of packets from the CPE node either directly to the first optical node without passing through the second optical node or directly to the second optical node, and each of the composite transport groups includes a plurality of logical channels arranged over off-network links from the CPE node to the first optical node and the second optical node and an on-network link between the first optical node and the second optical node;
 detecting a failure condition relating to one of the logical channels between the CPE node and the first optical node, the one logical channel being associated with one of the composite transport group; and
 routing the packets, transparent to the CPE node, over another one of the logical channels of the one composite transport group.

2. A method according to claim 1, wherein the one logical channel is designated as a primary channel and the other logical channel is designated as a secondary channel.

3. A method according to claim 1, wherein the first optical node and the second optical node are reconfigurable optical add/drop multiplexers.

4. A method according to claim 1, wherein the one composite transport group includes a first logical channel defining a connection path from the CPE node to the first optical node, and a second logical channel defining a connection path from the CPE node to the second optical node and then the first optical node.

5. A method according to claim 1, wherein the CPE node is a router.

6. A method according to claim 1, wherein the failure condition stems from either a link failure or equipment failure.

7. A method according to claim 1, wherein the first optical node and the second optical node are controlled by a common service provider.

8. A method according to claim 1, wherein the first optical node is a part of a first autonomous system and the second optical node is a part of a second autonomous system.

9. A system comprising:
- a plurality of composite transport groups defined among a customer premise equipment (CPE), a first optical node, and a second optical node;
- said first optical node being configured to communicate directly with the CPE node over an off-network link without passing through the second optical node;
- said second optical node being configured to communicate directly with the CPE node over another off-network link and to communicate with the first optical node over an on-network link;
- wherein the composite transport groups provide transport of packets from the CPE node to either the first optical node or the second optical node, and each of the composite transport groups includes a plurality of logical channels arranged over the off-network links from the CPE node to the first optical node and the second optical node and the on-network link between the first optical node and the second optical node,
- wherein the first optical node is configured to detect a failure condition relating to one of the logical channels between the CPE node and the first optical node, the one logical channel being associated with one of the composite transport group,
- wherein the packets are routed, transparent to the CPE node, over another one of the logical channels of the one composite transport group.

10. A system according to claim 9, wherein the one logical channel is designated as a primary channel and the other logical channel is designated as a secondary channel.

11. A system according to claim 9, wherein the first optical node and the second optical node are reconfigurable optical add/drop multiplexers.

12. A system according to claim 9, wherein the one composite transport group includes a first logical channel defining a connection path from the CPE node to the first optical node, and a second logical channel defining a connection path from the CPE node to the second optical node and then the first optical node.

13. A system according to claim 9, wherein the CPE node is a router.

14. A system according to claim 9, wherein the failure condition stems from either a link failure or equipment failure.

15. A system according to claim 9, wherein the first optical node and the second optical node are controlled by a common service provider.

16. A system according to claim 9, wherein the first optical node is a part of a first autonomous system and the second optical node is a part of a second autonomous system.

17. A method comprising:
- establishing a first logical channel within a composite transport group, wherein the first logical channel is established over a first link associated with a first service provider from a customer premise equipment (CPE) nod; configured to transport packets, directly to a first optical node;
- establishing a second logical channel within the composite transport group, wherein the second logical channel is established over a second link associated with a second service provider from the CPE node directly to a second optical node;
- receiving packets from the CPE node over the first logical channel by the first optical node without passing through the second optical node; and
- receiving packets from the CPE node over the second logical channel by the second optical node if the first logical channel experiences a fault condition, wherein switching to the second logical channel is transparent to the CPE node.

18. A method according to claim 17, further comprising:
- establishing another composite transport group to define a primary logical channel and a secondary logical channel to another CPE node.

19. A method according to claim 17, wherein the optical node is reconfigurable optical add/drop multiplexer.

20. An apparatus comprising:
- logic configured to establish a first logical channel within a composite transport group, wherein the first logical channel is established over a first link associated with a first service provider from a customer premise equipment (CPE) node, configured to transport packets, directly to a first optical node without passing through a second optical node;
- wherein the logic is further configured to establish a second logical channel within the composite transport group over a second link associated with a second service provider from the CPE node directly to the second optical node; and
- an interface configured to receive packets over the first logical channel, wherein the interface is further configured to receive packets over the second logical channel if the first logical channel experiences a fault condition, wherein switching to the second logical channel is transparent to the CPE node.

21. An apparatus according to claim 20, wherein the logic is further configured to establish another composite transport group to define a primary logical channel and a secondary logical channel to another CPE node.

22. An apparatus according to claim 20, wherein the optical node is reconfigurable optical add/drop multiplexer.

\* \* \* \* \*